US011119221B2

(12) United States Patent
Cohen et al.

(10) Patent No.: US 11,119,221 B2
(45) Date of Patent: Sep. 14, 2021

(54) DETECTION AND MITIGATION OF SATELLITE NAVIGATION SPOOFING

(71) Applicant: Regulus Cyber Ltd., Haifa (IL)

(72) Inventors: Gal Cohen, Haifa (IL); Yoav Zangvil, Haifa (IL); Stanislav Gutliansky, Haifa (IL); Dror Katalan, Shavei Tzion (IL); Avner Zangvil, Ramat-HaSharon (IL)

(73) Assignee: Regulus Cyber Ltd., Haifa (IL)

(*) Notice: Subject to any disclaimer, the term of this patent is extended or adjusted under 35 U.S.C. 154(b) by 0 days.

(21) Appl. No.: 17/099,840

(22) Filed: Nov. 17, 2020

(65) Prior Publication Data

US 2021/0072402 A1    Mar. 11, 2021

Related U.S. Application Data

(63) Continuation of application No. PCT/IL2020/050024, filed on Jan. 7, 2020.

(60) Provisional application No. 62/788,981, filed on Jan. 7, 2019.

(51) Int. Cl.
*G01S 19/21* (2010.01)
*G01S 19/06* (2010.01)
*G01S 19/08* (2010.01)
*G01S 19/24* (2010.01)

(52) U.S. Cl.
CPC ............ *G01S 19/215* (2013.01); *G01S 19/06* (2013.01); *G01S 19/08* (2013.01); *G01S 19/243* (2013.01)

(58) Field of Classification Search
CPC ........ G01S 19/06; G01S 19/08; G01S 19/215; G01S 19/243
See application file for complete search history.

(56) References Cited

U.S. PATENT DOCUMENTS

| 6,121,923 | A |   | 9/2000  | King            |            |
|-----------|---|---|---------|-----------------|------------|
| 6,707,422 | B2 |  | 3/2004  | Sheynblat et al. |           |
| 7,463,188 | B1 | * | 12/2008 | McBurney ............. | G01S 19/06 |
|           |   |   |         |                 | 342/357.43 |
| 7,605,751 | B2 |  | 10/2009 | Schipper et al. |            |

(Continued)

FOREIGN PATENT DOCUMENTS

| EP | 1901084        | 3/2008 |
| WO | WO 2010/105136 | 9/2010 |
| WO | WO 2020/144679 | 7/2020 |

OTHER PUBLICATIONS

International Search Report and the Written Opinion dated Mar. 22, 2020 From the International Searching Authority Re. Application No. PCT/IL2020/050024. (9 Pages).

(Continued)

*Primary Examiner* — Dao L Phan

(57) ABSTRACT

A device for mitigating satellite navigation spoofing includes processing circuitry which detects correlation peaks for PRNs in a satellite navigation signal. The TOAs of subframes of navigation messages associated with each of correlation peaks are recorded and analyzed to determine if they fall within a specified time window. Based on the analysis, the correlation peaks are classified as legitimate or as spoofed. A correct geographic location is computed from the navigation data associated with the legitimate correlation peaks. Corresponding methods for mitigating satellite navigation spoofing may be embodied in a hardware-based GNSS receiver and in a software-based GNSS receiver.

25 Claims, 8 Drawing Sheets

(56) References Cited

U.S. PATENT DOCUMENTS

| | | | |
|---|---|---|---|
| 7,924,220 B1* | 4/2011 | Lennen | G01S 19/24 |
| | | | 342/357.31 |
| 9,081,089 B2 | 7/2015 | Sato | |
| 2010/0117884 A1 | 5/2010 | Ahmed et al. | |
| 2014/0347220 A1 | 11/2014 | Gao | |
| 2014/0355726 A1* | 12/2014 | Elenes | H04L 27/2649 |
| | | | 375/343 |
| 2016/0146944 A1 | 5/2016 | Geren et al. | |
| 2019/0293802 A1 | 9/2019 | Kurby et al. | |
| 2020/0371247 A1 | 11/2020 | Marmet | |

OTHER PUBLICATIONS

Official Action dated Oct. 21, 2020 From the US Patent and Trademark Office Re. U.S. Appl. No. 16/910,230. (18 Pages).

Official Action dated Jul. 29, 2020 From the US Patent and Trademark Office Re. U.S. Appl. No. 16/910,230. (9 pages).

Broumandan et al. "Spoofing Detection, Classification and Cancelation (SDCC) Receiver Architecture for a Moving GNSS Receiver", GPS Solutions 19: 475-487, 2015.

Fernandez-Prades et al. "GNSS-SDR: An Open Source Tool for Researchers and Developers", Proceedings of the 24th International Technical Meeting of the Satellite Division of the Institute of Navigation, ION GNSS 2011, Portland, Oregan, USA, Sep. 20-23, 2011, p. 1-15, Sep. 20, 2011.

Guo et al. "Spoofing Detection and Mitigation in a Multi-correlator GPS Receiver Based on the Maximum Likelihood Principle", Sensors 19 (37): 1-17, 2019.

Jafarnia-Jahromi et al. "GPS Vulnerability to Spoofing Threats and a Review of Antispoofing Techniques", International Journal of Navigation and Observation 2012: 1-16, 2012.

Ranganathan et al. "SPREE: A Spoofing Resistant GPS Receiver", Proceeding of the 22nd Annual Conference on Mobile Computing and Networking, MobiCom '16, arXiv:1603.05462v1, p. 348-360, Mar. 17, 2016.

Advisory Action dated Jan. 29, 2021 From the US Patent and Trademark Office Re. U.S. Appl. No. 16/910,230. (4 Pages).

Notice of Allowance dated Apr. 13, 2021 From the US Patent and Trademark Office Re. U.S. Appl. No. 16/910,230. (13 Pages).

* cited by examiner

DETECTION AND MITIGATION OF SATELLITE NAVIGATION SPOOFING

RELATED APPLICATIONS

This application is a Continuation of PCT Patent Application No. PCT/IL2020/050024 having international filing date of Jan. 7, 2020, which claims the benefit of priority under 35 USC § 119(e) of U.S. Provisional Patent Application No. 62/788,981 filed on Jan. 7, 2019. The contents of the above applications are all incorporated by reference as if fully set forth herein in their entirety.

FIELD AND BACKGROUND OF THE INVENTION

The present invention, in some embodiments thereof, relates to mitigating satellite navigation spoofing and, more specifically, but not exclusively, to identifying a correct geographic location in the presence of satellite navigation spoofing.

Global Navigation Satellite System (GNSS) spoofing refers to the generation and transmission of GNSS signals in a way that causes GNSS receiver to receive them, validate them and use them to calculate and report the wrong position or time. Until recently, GNSS spoofing attacks required many resources and expensive equipment and was usually reserved for the military, other government agencies and well-funded organizations. However, in recent years software defined radios (SDR) and open-source GPS simulators have become widely available. This has led to an increasing occurrence of non-military GPS spoofing attacks.

GNSS receivers are designed to provide navigation data and typically do not have the ability to detect spoofing attacks. There are no solutions today for the commercial market that detect and mitigate spoofing attacks. There are some military solutions utilizing controller radiation-pattern antenna (CRPA) technology that, by design, combat jamming attacks. Another solution is to drop satellite navigation data suspected of being spoofed and not use it to calculate the geographic location.

Many systems rely on GNSS signals both for timing and location. As the spoofing threat is now at the hands of non-military hackers, a solution to identify and mitigate GNSS spoofing attacks is needed.

SUMMARY OF THE INVENTION

Embodiments of the invention acquire and track correlation peaks of PRNs in a satellite navigation signal. In the case of a spoofing attack, one or more PRNs may have multiple correlation peaks. In this case, multiple correlation peaks are tracked for a single PRN. The respective times of arrival of each navigation messages (or navigation message subframe) associated with the tracked correlation peaks are analyzed, and this analysis is used to classify the correlation peaks (and their associated navigation messages) as legitimate or spoofed. The navigation equations are solved for the legitimate navigation messages in order to calculate the correct location.

As explained in more detail below, the respective times of arrival of navigation message subframes which are extracted from received signals having legitimate correlation peaks should fall within a time window of a known maximum duration. Embodiments of the invention determine whether the times of arrival associated with detected correlation peaks fall within a specified time window, in order to distinguish between legitimate correlation peaks and spoofed correlation peaks.

Benefits of the invention include:

1) Preventing the spoofing attack from interfering with normal operations, thereby mitigating the effects of the attack;

2) Increased reliability of the geographic location decoded by the GNSS receiver;

3) Increased accuracy (the spoofer is prevented from causing a less accurate solution to the navigation equations);

4) Navigation data is more trustworthy so that other sensors for identifying the location are not necessary; and 5) Flexibility in allocating processing resources based on factors such as the type and precision of the spoofing attack.

Optionally, the navigation equations are also solved for the spoofed navigation messages in order to calculate the spoofed location. Knowledge of the spoofed location may provide information about the spoofer, the origin and/or goal of the spoofing attack and/or further steps to counteract the attack.

According to a first aspect of some embodiments of the present invention there is provided a device for mitigating satellite navigation spoofing which includes processing circuitry adapted to:

detect, in a satellite navigation signal, correlation peaks for a plurality of data sequences, each data sequence being associated with a different navigation satellite;

record respective times of arrival of subframes of navigation messages associated with each of the correlation peaks;

classify correlation peaks having respective times of arrival within a specified time window in a subframe of a navigation message as legitimate correlation peaks and correlation peaks having respective times of arrival outside of the specified time window in the subframe of the navigation message as spoofed correlation peaks; and decode navigation messages extracted from the legitimate correlation peaks to a correct geographic location.

According to some embodiments of the invention, the device is embedded in a global navigation satellite system integrated circuit.

According to a second aspect of some embodiments of the present invention there is provided a method for mitigating satellite navigation spoofing, which includes:

detecting, in a satellite navigation signal, correlation peaks for multiple data sequences, each of the data sequences being associated with a respective navigation satellite;

recording respective times of arrival of subframes of navigation messages associated with each of the correlation peaks;

classifying correlation peaks having times of arrival within a specified time window in a subframe of a navigation message as legitimate and correlation peaks having respective times of arrival outside of the specified time window in the subframe of the navigation message as spoofed; and decoding navigation messages extracted from the legitimate correlation peaks to a correct geographic location.

According to some embodiments of the invention, a navigation message associated with a correlation peak is a navigation message extracted from a received signal that is synchronized with the correlation peak, and the time of arrival of a subframe of the navigation message associated with the correlation peak is the time at which a specified data symbol of the subframe is received.

According to some embodiments of the invention, the navigation messages associated with the spoofed correlation peaks are decoded to a spoofed geographic location.

According to some embodiments of the invention, the time interval between successive time windows is the duration of a subframe of a navigation message.

According to some embodiments of the invention, the duration of the time window and the time interval between successive time windows are selected in accordance with characteristics of the satellite navigation signal.

According to some embodiments of the invention, the duration of the time window is from 17 milliseconds to 23 milliseconds. According to some further embodiments of the invention, the maximum duration of the time window is 20 milliseconds. According to alternate further embodiments of the invention, the maximum duration of the time window is 23 milliseconds.

According to some embodiments of the invention, the time window begins when the first time of arrival is observed for the current subframe.

According to some embodiments of the invention, the classifying further includes:
   comparing clock correction data and/or ephemeris data in subframes of at least one of the navigation messages; and
   identifying spoofed correlation peaks based on changes between the subframes of the navigation messages in the clock correction data and/or ephemeris data.

According to some embodiments of the invention, the detecting is performed during acquisition of the navigation signal.

According to some embodiments of the invention, the detecting includes seeking a plurality of correlation peaks for at least one of the data sequences over the entire duration of the navigation message subframe.

According to some embodiments of the invention, the detecting is performed by digital signal processing of a sampled navigation signal.

According to a third aspect of some embodiments of the present invention there is provided a device for mitigating satellite navigation spoofing which includes processing circuitry adapted to:
   detect, in a satellite navigation signal, correlation peaks for multiple data sequences, where the data sequences are associated with respective navigation satellites and multiple correlation peaks are present simultaneously for at least one of the data sequences;
   record times of arrival of navigation messages associated with each of the correlation peaks;
   classify a first subset of the correlation peaks as legitimate and a second subset of correlation peaks as spoofed by analyzing the recorded times of arrival; and
   decode navigation messages associated with the first subset of correlation peaks to a correct geographic location.

According to some embodiments of the invention, the processing circuitry is further adapted to decode the navigation messages associated with the second subset of correlation peaks to a spoofed geographic location.

According to some embodiments of the invention, the first and second subsets are non-overlapping.

According to some embodiments of the invention, for each subframe, the times of arrival of the navigational messages associated with the first subset of correlation peaks lie within a specified time window. According to further embodiments of the invention, wherein a maximum duration of the time window is 20 milliseconds and/or the time window begins when a first one of the times of arrival is observed for a current subframe.

According to some embodiments of the invention, classifying the correlation peaks into legitimate and spoofed includes:
   comparing clock correction data and/or ephemeris data in subframes of at least one of the navigation messages; and
   identifying spoofed correlation peaks based on changes in the clock correction data and/or ephemeris data between the subframes of the navigation messages.

According to some embodiments of the invention, is embedded in a global navigation satellite system integrated circuit.

According to some embodiments of the invention, the detecting is performed during acquisition of the navigation signal.

According to some embodiments of the invention, the detecting includes seeking a plurality of correlation peaks for a data sequence associated with a given navigation satellite over the entire duration of a navigation message subframe.

According to some embodiments of the invention, the detecting is performed by digital signal processing of a sampled navigation signal.

According to a fourth aspect of some embodiments of the present invention there is provided a method for mitigating satellite navigation spoofing. The method includes:
   detecting, in a satellite navigation signal, correlation peaks for multiple data sequences, where the data sequences are associated with respective navigation satellites and multiple correlation peaks are present simultaneously for at least one of the data sequences;
   recording times of arrival of navigation messages associated with each of the correlation peaks;
   classifying a first subset of the correlation peaks as legitimate and a second subset of the correlation peaks as spoofed by analyzing the recorded times of arrival; and
   decoding navigation messages associated with the first subset of correlation peaks to a correct geographic location.

According to some embodiments of the invention, the method further includes decoding navigation messages associated with the second subset of correlation peaks to a spoofed geographic location.

According to some embodiments of the invention, the first and second subsets are non-overlapping.

According to some embodiments of the invention, for each subframe, the times of arrival of the navigational messages associated with the first subset of correlation peaks lie within a specified time window.

According to some embodiments of the invention, the maximum duration of the time window is 20 milliseconds.

According to some embodiments of the invention, the time window begins when a first one of the times of arrival is observed for a current subframe.

According to some embodiments of the invention, classifying the correlation peaks into legitimate and spoofed includes:
   comparing clock correction data and/or ephemeris data in subframes of at least one of the navigation messages; and identifying spoofed correlation peaks based on changes in the clock correction data and/or ephemeris data between the subframes of the navigation messages.

According to some embodiments of the invention, the detecting is performed during acquisition of the navigation signal.

According to some embodiments of the invention, the detecting includes seeking a plurality of correlation peaks for a data sequence associated with a given navigation satellite over an entire duration of a navigation message subframe.

According to some embodiments of the invention the method further includes:
receiving the satellite navigation signal; and
converting the received satellite navigation signal into sampled navigation signal data, the detecting being performed on the sampled navigation signal data.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

The present invention, in some embodiments thereof, relates to mitigating satellite navigation spoofing and, more specifically, but not exclusively, to identifying a correct geographic location in the presence of satellite navigation spoofing.

Embodiments of the invention differentiate between correlation peaks of legitimate and spoofed GNSS signals by detecting whether the times of arrival of the navigation messages (and/or navigation message subframes) associated with each correlation peak fall within a specified time window. Data contained within the navigation messages, such as clock correction and ephemeris data, may additionally be used to differentiate between the spoofed and real correlation peaks.

For purposes of better understanding some embodiments of the present invention, some aspects of a global navigation satellite system (GNSS), and in particular the Global Positioning System (GPS), are now described. It is to be understood that embodiments of the invention are not limited to the GPS navigational system but rather may be adapted to the protocols and formats of the GNSS environment in which it is operating. Embodiments of the invention may be adapted to all GNSS constellations, including but not limited to: GPS, GLONASS, Galileo, Beidou and RNSS constellations (e.g. NAVIC, QZSS).

Figure 1:
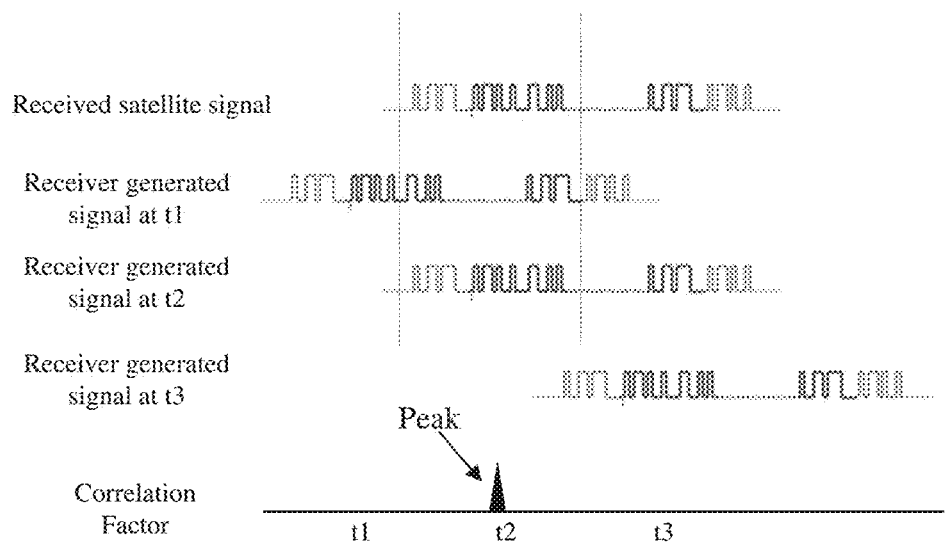
FIG. 1 illustrates searching for a correlation maximum for a PRN code.

In standard GNSS technology, a GNSS receiver searches for a signal from a navigation satellite by comparing a local copy of a PRN code to that transmitted by the satellite as illustrated in FIG. 1. Each PRN code is associated with a specific satellite and the PRN codes of different satellites have low correlation. When a correlation is found between a particular PRN and a received satellite navigation signal, the correlation indicates that signals transmitted by the associated satellite are being received.

Figure 2:
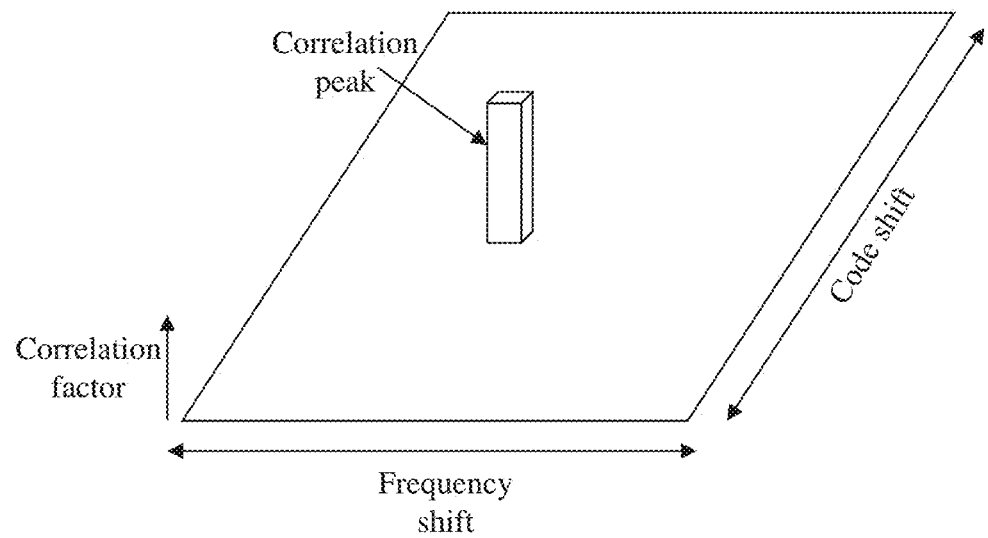
FIG. 2 illustrates the correlation of a single PRN in a non-spoofed environment.
Figure 3:
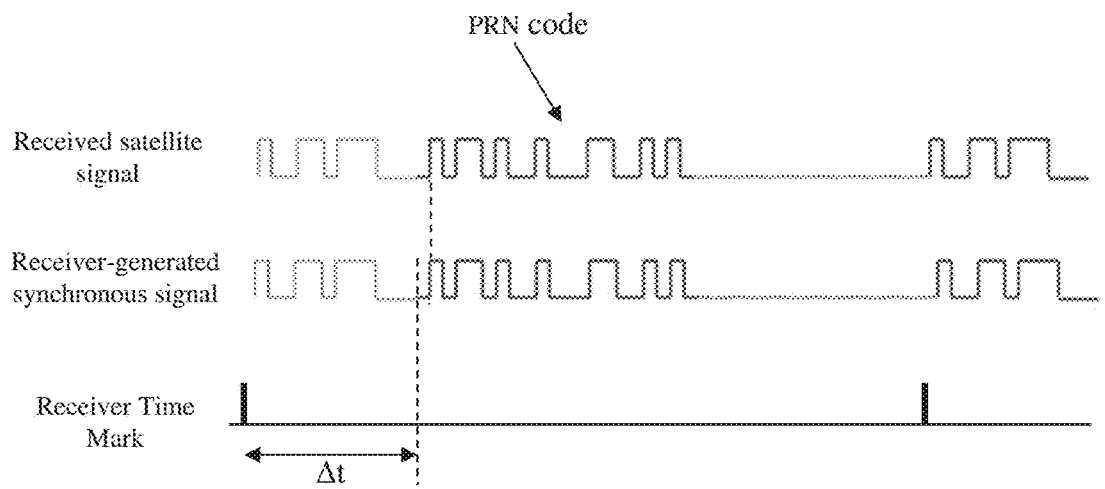
FIG. 3 illustrates an example of the determination of the satellite signal arrival time.

To find a particular PRN code, the GNSS receiver goes through an acquisition stage where a 2D space (Doppler shift and code shift) is searched for correlation with a local copy of a PRN code, as illustrated in FIG. 2. Once a correlation peak is found between the local copy of the PRN code and the received signal, the time of arrival (TOA) of navigation messages from the associated satellite may be determined as illustrated in FIG. 3.

The correlation maximum is sequentially searched and maintained to so that the satellite signal and the PRN sequences generated by the receiver are continually synchronous. The time-shifted PRN sequence is linked to the satellite signal, and thus the navigation message data is reconstructed and used to solve the navigation equations (along with navigation message data received from other satellites).

A spoofer attempting to perform a GPS spoof attack will transmit a signal structured to resemble a set of normal GPS signals coming from multiple satellites. Correlation peaks will be found with the PRNs associated with those multiple satellite.

Figure 4:
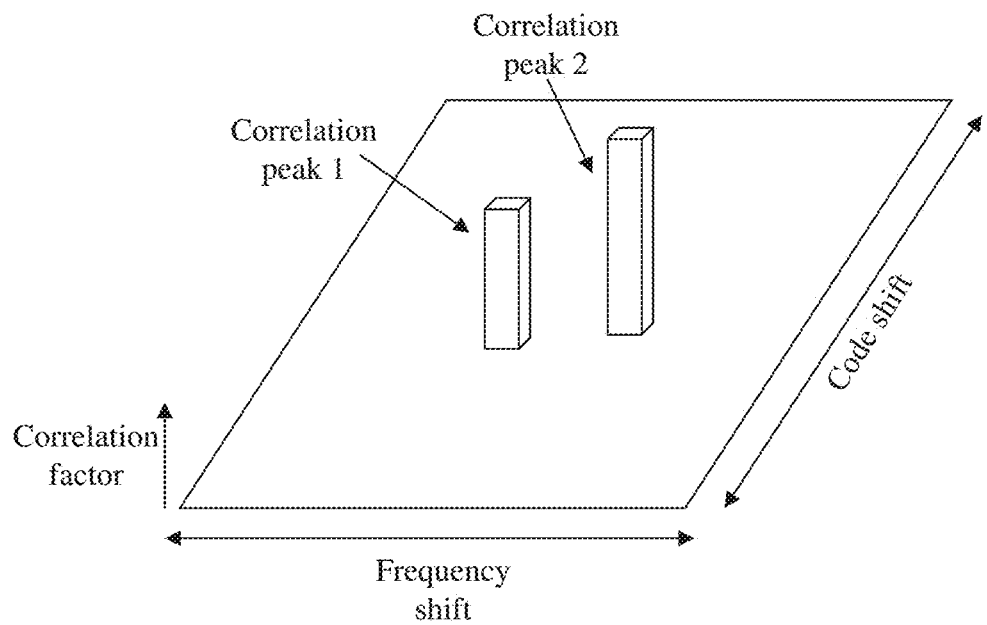
FIG. 4 illustrates two correlation peaks for a single PRN in a spoofed environment.

As illustrated in FIG. 4, in the presence of a spoofer two correlation peaks may be found for a single PRN. A standard GNSS receiver will lock on to the spoofed navigation signal when a high enough correlation is found early in the search phase. It is noted that the real correlation peaks are still present and may be found during acquisition mode when the correlation is high enough. The spoofer may also arrange the relative times of arrival of the spoofed navigation messages to mimic the real arrival times based on the known locations of the satellites. It is noted that in some scenarios only a single peak will be present if either the real navigation signal or the spoofed navigation signal is not available (e.g., when blocked by buildings in urban canyons).

Some high-end receivers with many channels have the ability to track the same PRN multiple times. If such a GNSS receiver identifies two correlation peaks for a single PRN, it might be an indication that a spoofing attack is taking place.

One of the biggest problems in countering GNSS spoofing attacks is to determine which correlation peaks are transmitted by the spoofer and which are transmitted by real satellites.

Navigation messages are received by GNSS receiver with a delay proportional to the distance between the transmitting satellite and the GNSS receiver. This delay is different for each satellite and depends on the satellite position (elevation and orbit). The orbit is defined by the constellation of the particular GNSS system. For example, in GPS the orbit is 20,180 km and the travel time is approximately 67 msec; in GLONASS the orbit is 19,400 km and the travel time is approximately 65 msec.

Figure 5:
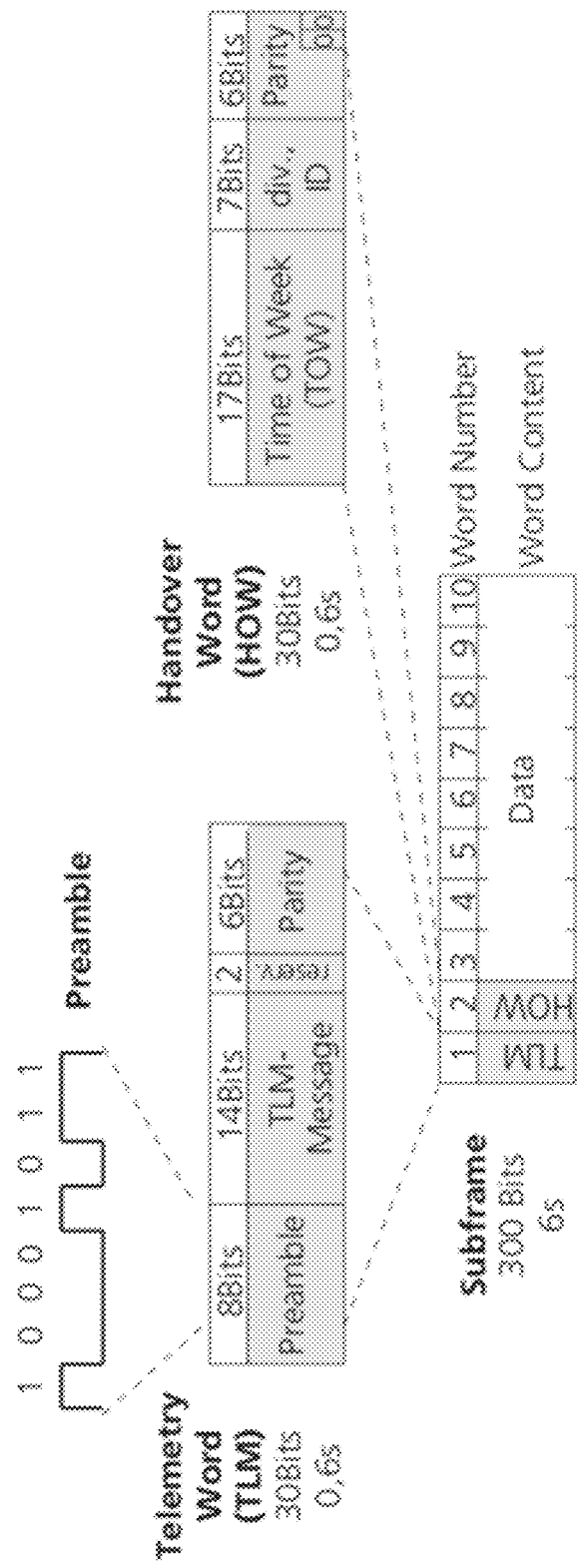
FIG. 5 shows the structure of a GPS Telemetry Word (where the preamble is stored) and of a Handover Word.

GNSS communication protocols enable the GNSS receiver to determine the time of arrival of the navigation messages with high accuracy. For example, in GPS, every subframe of the navigation message begins with an 8-bit preamble, as shown in FIG. 5. The preamble in the Telemetry Word (TLM) is a defined pattern with the structure 10001011. This bit sequence is repeated every 6 seconds. In the absence of a spoofer, the difference between the times of arrival of navigation messages from all the received satellites may be up to 18 msec according to the satellite orbit and earth's geometry and excluding unknown delays (e.g. atmospheric), calculated as follows:

$$R_{min} = 20{,}130 \text{ km} \to t_{min} = \frac{R_{min}}{C} = \frac{20{,}130}{299{,}792} = 67 \text{ ms}$$

$$R_{max} = 25{,}723 \text{ km} \to t_{max} = \frac{R_{max}}{C} = \frac{25{,}723}{299{,}792} = 85 \text{ ms}$$

$$\Delta t = t_{max} - t_{min} = 18 \text{ ms}$$

Delays due to other factors such as atmospheric conditions might spread the total time window for GPS slightly, to about 20 msec. GLONASS orbits at 19,100 km and Galileo orbits at 23,600 km, so their time windows are approximately the same as the GPS time window (from about 17 msec to about 23 msec).

Figure 6:
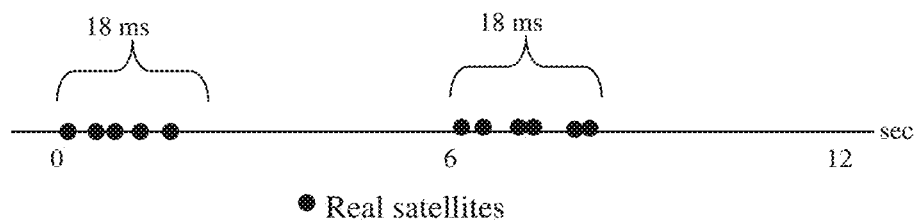
FIG. 6 illustrates times of arrival of legitimate satellite navigation signals during two subframes.

FIG. 6 illustrates possible arrival times of legitimate GPS satellite navigation transmissions. The respective TOA associated with each correlation peak is indicated by a single dot along the time axis. It is seen that the TOAs associated with correlation peaks in the first subframe are concentrated just after the $0^{th}$ second. The TOAs for all PRNs having correlation peaks in the second subframe are concentrated just after the $6^{th}$ second, and so on. (It is noted that FIGS. 6 and 7A-B are not to scale; the area after each 6th second is "zoomed in" to demonstrate the 18 msec spread in the arrival time.)

Figure 7A:
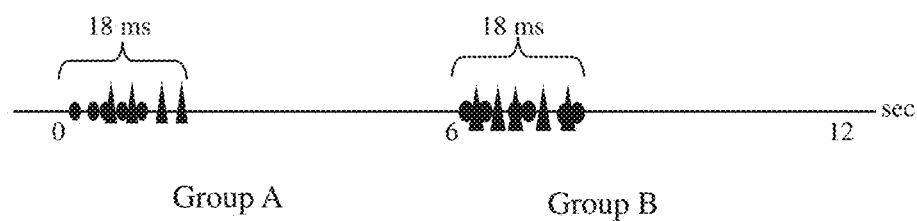
FIGS. 7A and 7B illustrate times of arrival of two groups of PRNs for respective cases of a GNSS spoofing attack.
Figure 7B:
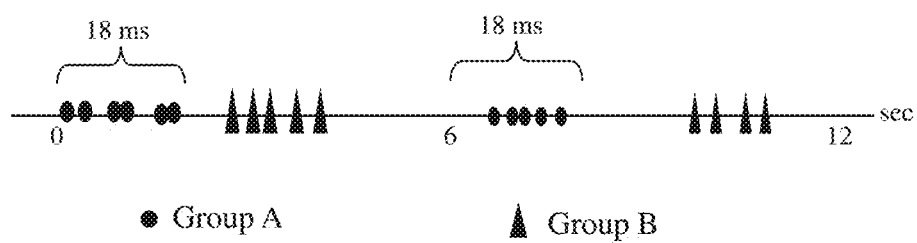

FIGS. 7A and 7B show two respective cases of relative TOAs for two groups of navigation signals (Group A and Group B). In order for the spoofing attack to remain undetected, the subframes of the spoofed navigation messages should align perfectly with the subframes arriving from the satellites. To do that the signal's arrival time must fall in the 6 seconds subframe time and the PRN arrival times must align within an 18 msec time window. In FIG. 7A, the signal arrival times of both Group A and Group B fall within the 6 seconds subframe time and the PRN arrival times are within the 18 msec window. In FIG. 7B, the signal arrival times of Group B fall within the 6 seconds subframe time, however Group B's PRN arrival times are not all within the 18 msec window.

Assuming the spoofer is aiming at a minimum spoofing distance of 20 meters, the resolution in time hit must be aligned to 67 nanoseconds:

$$\Delta R_{min} = 20 \text{ m} = 0.02 \text{ km}$$

$$\Delta t_{min} = \frac{\Delta R_{min}}{C} = \frac{0.02}{299{,}792} = 67 \cdot 10^{-9} \text{ sec} = 67 \text{ ns}$$

The probability that a spoofer will hit this time window is extremely small, on the order of 1:300,000.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In embodiments of the invention, correlation peaks are detected in a navigation signal for PRNs associated with navigation satellites. When a correlation peak is found for a PRN, the device continues to seek for additional correlation peaks for the same PRN. No more than one correlation peak may be legitimate for a single PRN. However, it is not yet known which (if any) of the correlation peaks is legitimate.

Optionally, the detection of correlation peaks for a PRN is performed over the entire navigation message and/or navigation message subframe and/or over a specified portion of a subframe. Further optionally, the detection of correlation peaks is performed continuously as part of the GNSS acquisition process.

The decision of which PRNs to attempt to correlate with the navigation signal may be made by any means known in the art (e.g. PRNs associated with satellites expected to be received at the current location). Optionally, multiple correlation peaks are sought only for some of these PRNs in order to optimize processing resource allocation.

Once a correlation peak is detected, the correlation peak is tracked and the TOAs of navigation messages associated with the correlation peak are recorded. The recorded TOAs are analyzed in order to classify the correlation peaks as either legitimate or spoofed.

As used herein the terms "time of arrival" and "TOA" mean the time at which a specific bit or symbol of a subframe of a navigation message is received by the GNSS receiver. For example the TOA may be considered to be the time at which the last symbol or bit in the subframe is received, the time at which the preamble is received, etc.

As used herein the terms "time of arrival associated with a correlation peak" and "time of arrival of a navigation message associated with the correlation peak" mean the time of arrival of a navigation message (or subframe of a navigation message) which is extracted from a received signal that is synchronized with the correlation peak.

As used herein the term "navigation message extracted from a correlation peak" means a navigation message which is extracted from a received signal that is synchronized with the correlation peak.

As discussed above, in a GNSS system the TOAs of the signals transmitted by all the navigational satellites in range will fall within a very short time window. The analysis of the TOAs determines whether the navigation message TOAs in a given subframe fall within a specified time window. In order for a correlation peak to be classified as legitimate, the TOAs of its associated navigational messages must lie within this time window. Correlation peaks having TOAs outside the time window are classified as spoofed. It is noted that even if the TOA of a navigation message does fall within the time window it is not necessarily legitimate, as demonstrated by FIG. 7A-B in which the TOAs of the real and spoofed navigation messages overlap.

After the correlation peaks have been classified as legitimate or spoofed, the navigation messages associated with legitimate correlation peaks are decoded to a first geographic location (denoted the correct geographic location). Optionally the decoding is further based on additional navigation data. Optionally, if the navigation equations for the correlation peaks classified as legitimate do not converge, an additional attempt is made to identify the correct geographic location using navigation messages associated with a different set of correlation peaks. For example, navigation messages associated with some of the correlation peaks may be ignored and the location decoded using a smaller set of navigation data.

Optionally, navigation messages associated with some or all of the spoofed correlation peaks are decoded to a second geographic location, denoted the spoofed geographic location. Knowing the spoofed location may assist in identifying the spoofer and/or the spoofer's intentions.

If the navigational equations are applied to spoofed signals the decoded geographical location may not be reliable. For example, the result may be:

No solution due to internal error or inconsistency in the GNSS equations;

Solution with non-realistic coordinates (e.g., altitude of 10 KM when the receiver is on the ground and the spoofed geographical location is also on the ground);

Solution with coordinates that is between the spoofed geographical location and the correct geographical location.

Optionally, the validity of the decoded geographical location is checked for anomalies, for example by using a sphere to identify incorrect solutions. If an anomalous solution to the navigational equations is identified, the spoofed geographical is discarded. Further optionally, a different set of correlation peaks which are classified as legitimate is used to obtain a non-anomalous solution to the navigational equations.

Optionally, the time window repeats periodically (e.g. based on the duration of the navigation message subframe as illustrated in FIG. 6). For example, in GPS systems the time window may repeat every 6 seconds and in GLONASS every 2 seconds.

Determining the TOA of a navigation message may be performed by any means known in the art (e.g. by a preamble search). For simplicity, in some portions of the description the TOA for a subframe of a navigation message is considered to be the arrival time of the preamble, however it is to be understood that the TOA of the subframe may be determined by any portion of the navigation message which is constrained to fall within a limited time window.

Optionally, each correlation peak is associated with information which includes but is not limited to:

1) A PRN;

2) Navigation messages which are extracted from the navigation signal;

3) Time of arrival of navigation message(s) and/or navigation message subframe(s); and 4) A classification as legitimate or spoofed (or undetermined prior to classification of the correlation peak).

As used herein, the term "spoofed correlation peak" means a correlation peak which has been classified as spoofed according to embodiments of the invention.

As used herein, the term "legitimate correlation peak" means a correlation peak which has been classified as legitimate according to embodiments of the invention.

As used herein, the term "navigation messages associated with a correlation peak" means navigation messages which are reconstructed by tracking a correlation peak. If more than one correlation peak is found for a single PRN (e.g. during a spoofing attack), each of the correlation peaks is associated with a different navigation message for that PRN.

As used herein, the term "spoofed navigation messages" means navigation messages which are associated with a correlation peak that has been classified as "spoofed".

As used herein, the term "legitimate navigation messages" means navigation messages which are associated with a correlation peak that has been classified as "legitimate".

Optionally, recording the TOAs includes storing the TOAs associated with each of the correlation peaks in a memory. Optionally the memory is internal. Alternately, the memory element is external, for example in another portion of the GNSS receiver. Such TOA records are maintained for some or all detected correlation peaks. Optionally, recording TOAs of associated navigation messages is performed only for some correlation peaks, for example only for PRNs associated with more than one correlation peak.

Optionally, the maximum duration of the time window is a time length of between 17-23 milliseconds. Further optionally, the time window duration is 20 msec. Optionally the maximum duration of the time window is selected based on the parameters of the GNSS system.

Optionally, the time window begins when the first TOA is observed in the current subframe.

Optionally, the navigation message data and/or message structure are also used to classify a correlation peak as legitimate or spoofed. This examination is combined with the TOA analysis in order to make a final classification for the correlation peaks. For example, an analysis of the navigation message data may be performed only for PRNs with a TOA within the specified time window.

In alternate or additional optional embodiments, the clock and/or ephemeris data is also used to identify spoofed correlation peaks. The clock and/or ephemeris data is compared between subframes of a navigation message. Changes in the clock and/or ephemeris data between subframes are indicative of spoofed correlation peaks. An exemplary embodiment of using both TOA analysis and a comparison of clock and/or ephemeris data to classify a correlation peak is presented below.

Device for Mitigating GNSS Spoofing

Figure 8:
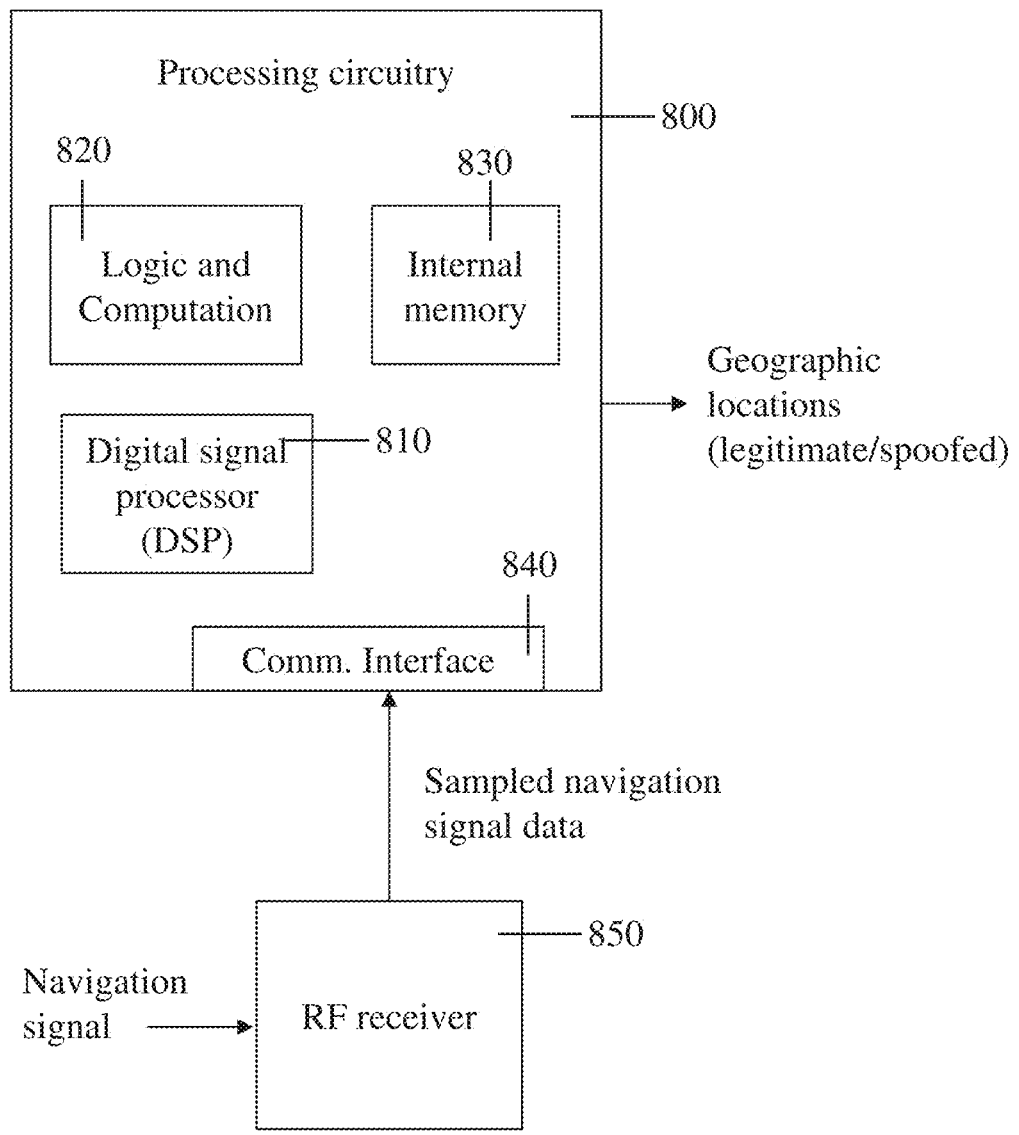
FIG. 8 is a simplified block diagram of a device for mitigating satellite navigation spoofing, according to embodiments of the invention.

Reference is now made to FIG. 8 which is a simplified block diagram of a device for mitigating satellite navigation spoofing, according to an embodiment of the invention. The device includes processing circuitry 800 which is adapted to:

a) Detect correlation peaks in a satellite navigation signal. Each correlation peak is correlated with the PRN of a navigation satellite;

b) Record the TOAs of the navigation messages associated with detected correlation peaks;

c) Classify correlation peaks having respective times of arrival within a specified time window in a subframe of a navigation message as legitimate correlation peaks and correlation peaks having respective times of arrival outside the specified time window as spoofed correlation peaks; and d) Decode the navigation messages from the legitimate correlation peaks to a correct geographic location.

Optionally, processing circuitry 800 is adapted to one or more additional tasks including but not limited to:

a) Acquisition and tracking of correlation peaks;

b) Extracting navigation messages associated with correlation peaks from the navigation signal;

c) Defining the time window(s) used for classifying the correlation peaks;

d) Comparison of clock and/or ephemeris and/or other navigation message data;

e) Solving the navigation equations; and f) Storing and retrieving data from an internal and/or external memory.

Optionally, detecting correlation peaks in a satellite navigation signal includes seeking a plurality of correlation peaks for a data sequence associated with a navigation satellite (i.e. PRN) over the entire duration of a navigation message subframe.

Optionally, the correlation peaks are detected by digital signal processing of a sampled navigation signal.

In an exemplary circuit architecture, processing circuitry 800 includes logic and computation module 820 and digital signal processor (DSP) 810, which operate together to perform the required processing, analysis and computation.

Optionally, processing circuitry 800 further includes internal memory 830 which is used for storing the recorded TOAs and/or other data.

Optionally, processing circuitry 800 includes communication interface 840 which inputs the sampled navigation signal data from RF receiver 850.

Optional embodiments of the device described herein include but are not limited to:

1) An IP core in a GNSS chip, such as an Application-Specific Integrated Circuit (ASIC) or field-programmable gate array (FPGA).

2) A hardware GNSS receiver.

3) A software GNSS receiver (using a processor and/or processing circuitry of the computer running the software-based GNSS receiver).

Optionally the device includes and/or is in communication with at least one non-transitory memory which stores code instructions which when executed by the processing circuitry cause it to perform some or all of the tasks described herein.

Optionally, the input to the processing circuitry is a sampled navigation signal provided by an RF front end (e.g. quadrature signals, IQ). Alternately or additionally, the device includes RF signal processing capabilities, and some of the signal processing performed by the device prior to down conversion and sampling.

Exemplary GNSS Receiver

Figure 9:
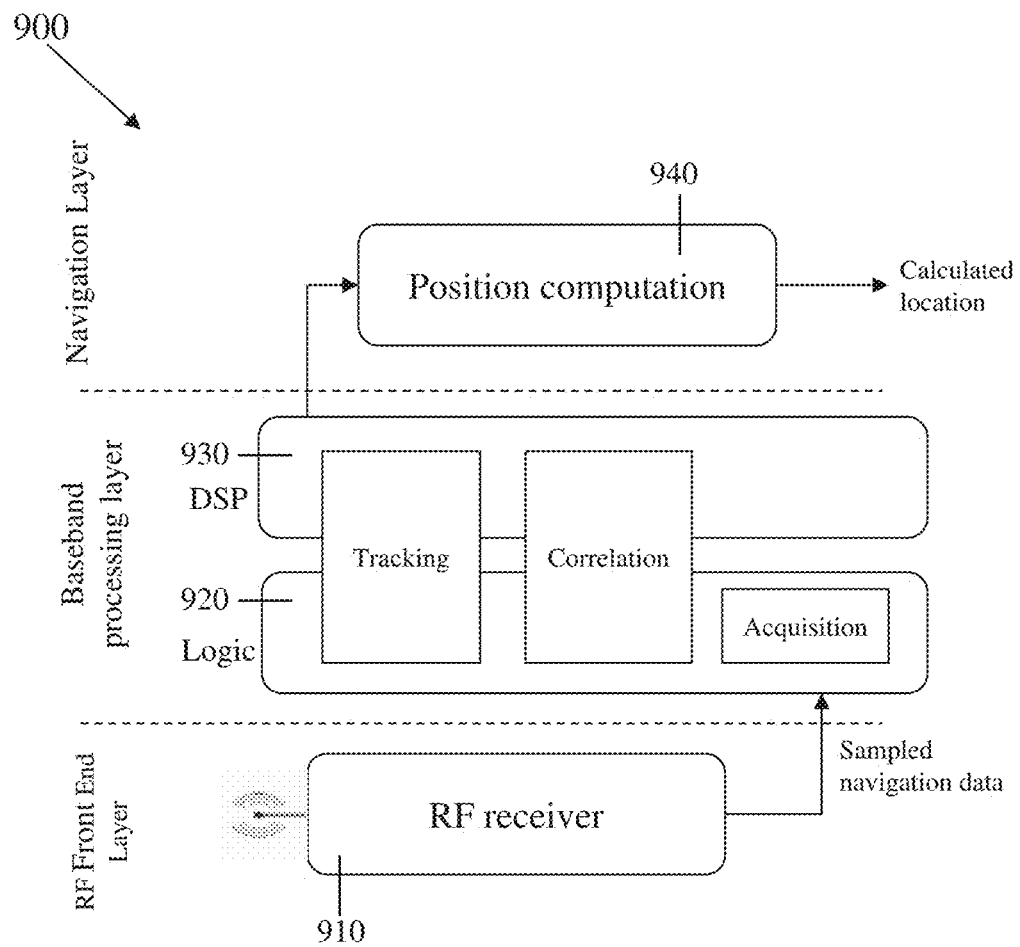
FIG. 9 is a simplified block diagram of a GNSS receiver, according to an exemplary embodiment of the invention.

Reference is now made to FIG. 9, which is a simplified block diagram of a GNSS receiver according to an exemplary embodiment of the invention.

GNSS receiver 900 includes four layers:

1) RF Front End Layer—includes RF front end 910 which samples the analog RF signal and converts it into sampled navigation data, optionally in the form of in-phase and quadrature data (IQ). These samples enter the baseband processing layer.

2) Baseband Processing Layer—includes logic unit 920 and DSP 930 which together perform acquisition, correlation and tracking, and provide the legitimate navigation data (and optionally the spoofed navigation data) to position computation unit 940.

3) Navigation Layer—includes position computation unit 940 which solves the navigation equations and outputs geographic locations.

The architecture and logic of GNSS Receiver 900:

1) Provides a sufficient number of channels in baseband to allow acquisition of the same PRN more than a single time.

2) When searching the doppler shift and code shift domain for a correlation peak, continues searching for additional correlation peaks.

3) Tracks all correlation peaks, not just a single correlation peak per PRN.

4) Computes multiple geographical locations from the navigation data, from legitimate and spoofed navigation messages.

Method for Mitigating Satellite Navigation Spoofing

Figure 10:
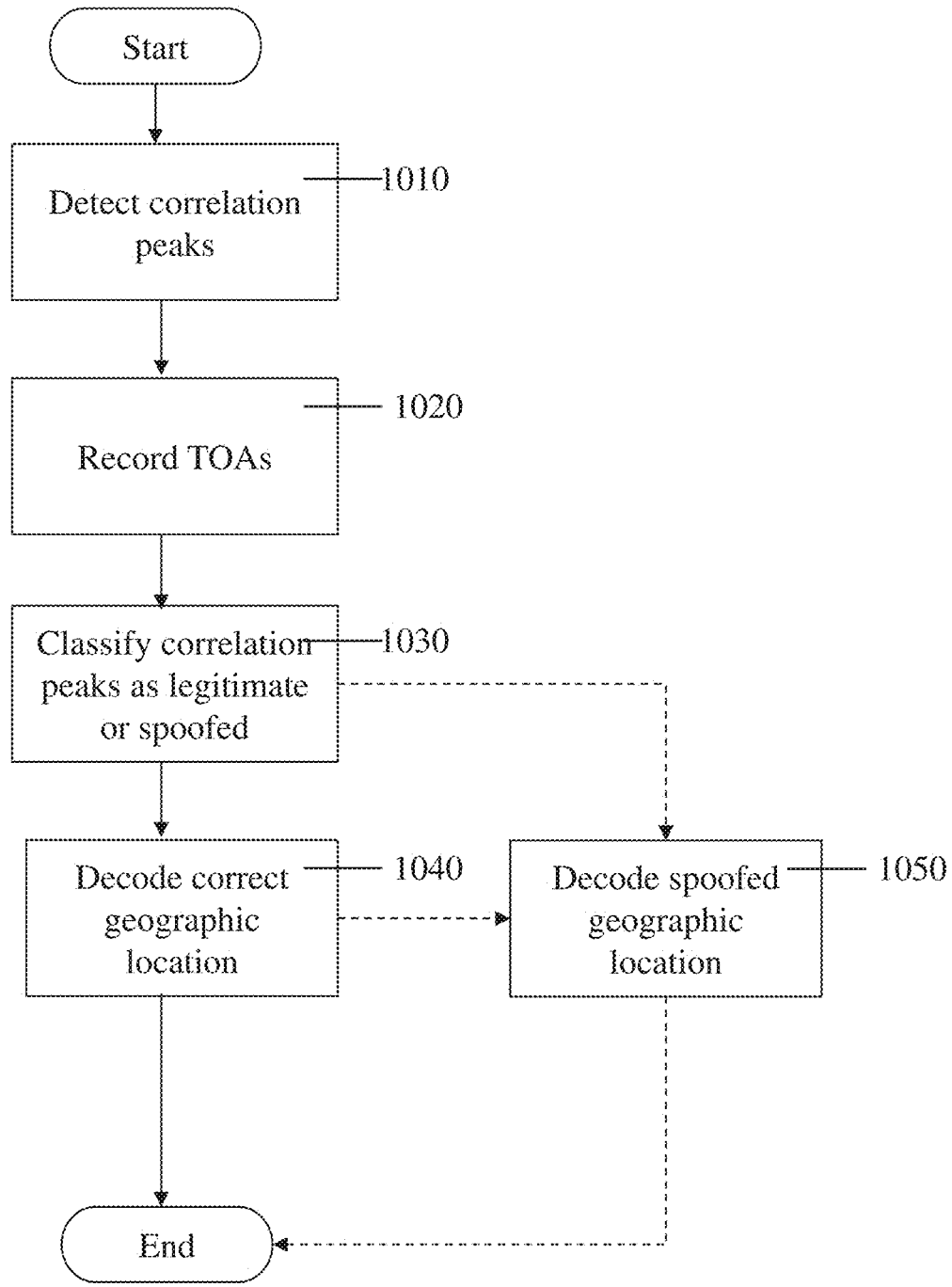
FIG. 10 is a simplified flowchart of a method for mitigating satellite navigation spoofing, according to embodiments of the invention.

Reference is now made to FIG. 10, which is a simplified flowchart of a method for mitigating satellite navigation spoofing, according to embodiments of the invention.

In 1010, correlation peaks for PRNs are detected in a satellite navigation signal. Each PRN is associated with a respective navigation satellite.

In 1020, the arrival times (TOAs) of navigation messages associated with each of the correlation peaks are recorded.

In 1030, a subset of the detected correlation peaks is classified as legitimate. Some or all of the remaining correlation peaks are classified as spoofed. The classification is based on an analysis of the recorded times of arrival, and optionally clock correction data and/or ephemeris data (such as Issue of Data, Clock and/or Issue of Data Ephemeris).

In 1040, navigation messages associated with the legitimate correlation peaks are decoded to a correct geographic location.

Optionally, navigation messages associated with the spoofed correlation peaks are decoded to a spoofed geographic location in 1050.

Optionally, the TOAs of navigational messages associated with the legitimate correlation peaks lie within a specified time window. Further optionally, the maximum duration of the time window is a selected time length of between 17-23 milliseconds. Further optionally, the time window duration is 20 msec.

Optionally, the time window begins when the first TOA is observed in the current subframe.

Optionally, for at least one correlation peak, classifying a correlation peak as legitimate or spoofed includes:

a) Comparing clock correction and/or ephemeris data in subframes of at least one of the navigation messages; and b) Identifying spoofed correlation peaks based on changes in the clock correction and/or ephemeris data between the subframes of the navigation messages.

Optionally, detecting one or more correlation peaks for the PRNs is performed during acquisition of the navigation signal.

Optionally, detecting correlation peaks includes seeking multiple correlation peaks for at least one PRN over an entire navigation message subframe.

Optionally, the method further includes receiving the satellite navigation signal and converting the received satellite navigation signal into sampled navigation signal data.

Optionally the method is performed by a software-based GNSS receiver. In alternate embodiments of the invention, the method is performed by processing circuitry in a GNSS receiver or chip.

Figure 11:
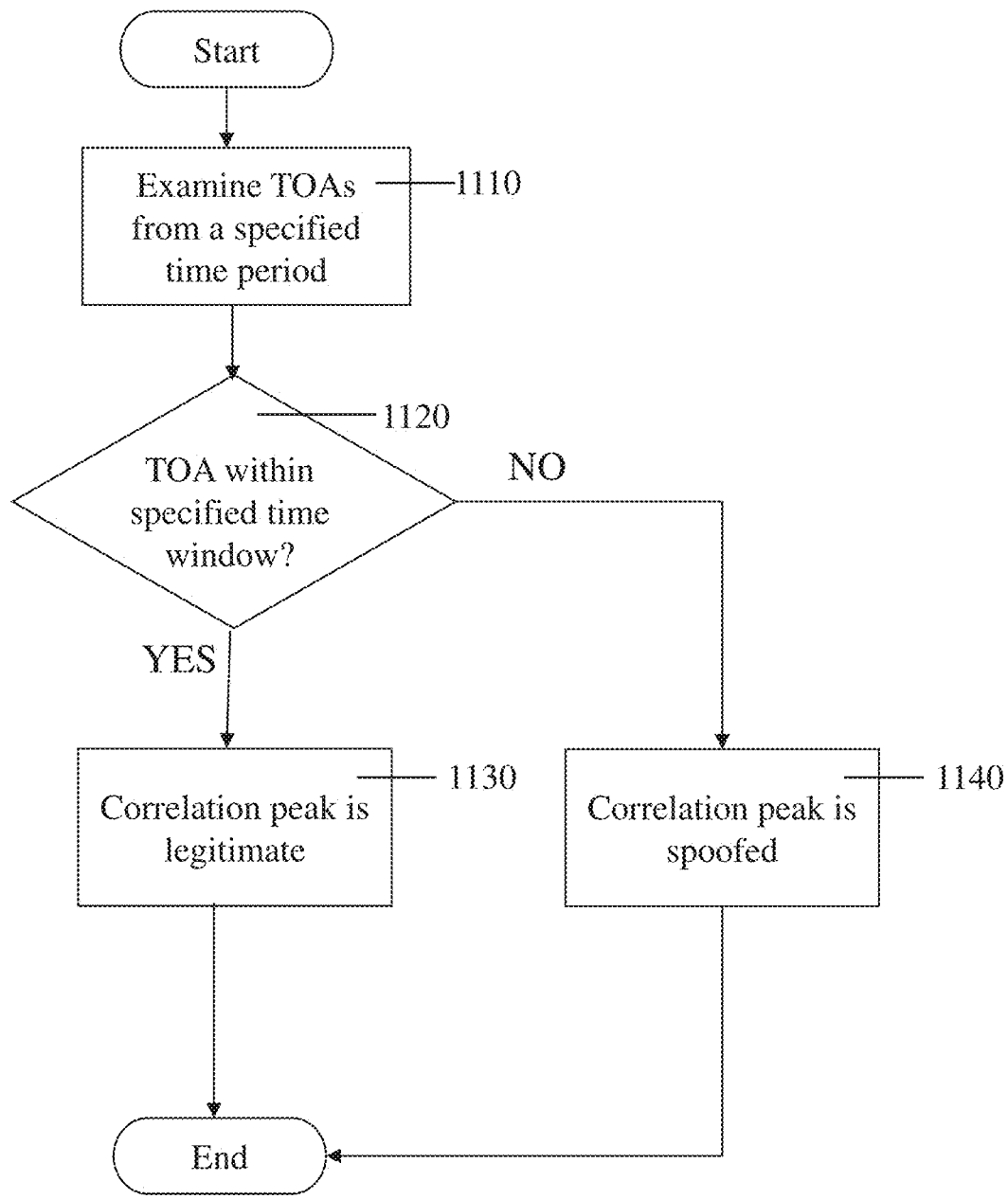
FIG. 11 is a simplified flowchart of a method for classifying correlation peaks, according to embodiments of the invention.

Reference is now made to FIG. 11, which is a simplified flowchart of a method for classifying correlation peaks, in accordance with embodiments of the invention.

The classification of the correlation peaks is performed after the TOAs are recorded and are available for analysis.

In 1110, the TOAs of signals which arrive during a specified time period are examined. Optionally, this time period is the duration of a navigation message subframe.

In 1120, each TOA is checked to see if it falls within the specified time window within the time period.

If the TOA falls within the specified time window, in 1130 the associated correlation peak is classified as legitimate. If the TOA falls outside the specified time window, in 1140 the associated correlation peak is classified as spoofed.

Exemplary Embodiment of Method for Mitigating GPS Spoofing

In an exemplary embodiment, computation of the legitimate and spoofed geographic locations is performed as follows:
1. For a single PRN, once a correlation peak is found a channel is dedicated to tracking that peak and extracting the navigation message (the data) by looking for the 8-bit preamble.
2. The preamble search is done for each tracked correlation peak.
3. The TOA (time of arrival) of each correlation peak is calculated based on the time the preamble was found.
4. All preambles should reside within an 18 ms windows each 6 seconds when a new subframe is expected to arrive.
5. The navigation solver includes the TOA of each correlation peak in the position solution only if they all reside in the 18 ms window and calculates a first location (the correct location).
6. The navigation solver waits for additional preambles to arrive in the 6 second subframe window.
7. The navigation solver uses the second group of TOAs of each PRN to calculate the second location (the spoofed location).
8. If PRNs associated with more than one TOA (i.e. multiple correlation peaks) are found within the 18 ms window the following approach is taken to separate them into two groups:
    a. The navigation solver waits for subframe 1 for clock correction data, and for subframe 2 and subframe 3 where the ephemeris data is found.
    b. The IODE (issue of data ephemeris) and/or IODC (issue of data, clock) parameters are compared between subframe 1, subframe 2 and subframe 3.
    c. A change in the IODE/IODC is an indication of a spoofed message.
    d. All PRNs which exhibit a constant change in IODE/IODC are marked as group A.
    e. All PRNs with no change in IODE/IODC are marked as group B.
    f. The navigation solver calculates two positions based on the TOA of each preamble in group A and the TOA of each preamble in group B.

In summary, embodiments of the invention enable a GNSS system to continue with normal operations during a spoofing attack, by analyzing the arrival times (TOAs) of navigation messages to determine whether they are legitimate or spoofed. The TOAs of legitimate navigation messages must fall within a short time window (typically on the order of 20 msec). Legitimate navigation messages are decoded into the correct geographic location. Data in the navigation message subframes (e.g. clock correction and/or ephemeris data) may also be used to determine whether a navigation message is legitimate or spoofed.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant GNSS systems, navigation messages, techniques for acquiring and tracking navigation messages, digital signal processors, RF front ends, processing circuitry, GNSS receivers (hardware and software) and IP core technology will be developed and the scope of the terms GNSS, navigation message, acquisition, tracking, digital signal processor, RF front end, processing circuitry, GNSS receiver and IP core are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A device for mitigating satellite navigation spoofing, comprising processing circuitry adapted to:
   detect, in sampled navigation signal data, correlation peaks for a plurality of data sequences, said data sequences being associated with respective navigation satellites, at least two of said data sequences being associated with different navigation satellites;
   record respective times of arrival of subframes of navigation messages associated with each of said correlation peaks;
   classify correlation peaks having respective times of arrival within a specified time window within a single subframe as legitimate correlation peaks and correlation peaks having respective times of arrival outside of said specified time window as spoofed correlation peaks; and
   decode navigation messages extracted from said legitimate correlation peaks to a correct geographic location.

2. A device according to claim 1, wherein said navigation message associated with a correlation peak comprises a navigation message extracted from a received signal that is synchronized with said correlation peak, and said time of arrival of a subframe of said navigation message associated with a correlation peak comprises a time at which a specified data symbol of said subframe is received.

3. A device according to claim 1, wherein said processing circuitry is further adapted to decode said navigation messages associated with said spoofed correlation peaks to a spoofed geographic location.

4. A device according to claim 1, wherein a time interval between successive time windows comprises a duration of a subframe of a navigation message.

5. A device according to claim 1, wherein a duration of said time window and a time interval between successive time windows are selected in accordance with characteristics of a Global Navigation Satellite System.

6. A device according to claim 1, wherein a maximum duration of said time window is 20 milliseconds.

7. A device according to claim 1, wherein a maximum duration of said time window is 23 milliseconds.

8. A device according to claim 1, wherein a duration of said time window is from 17 milliseconds to 23 milliseconds.

9. A device according to claim 1, wherein said time window begins when a first one of said times of arrival is observed for a current subframe.

10. A device according to claim 1, wherein said classifying further comprises:
    comparing at least one of clock correction data and ephemeris data in subframes of at least one of said navigation messages; and
    identifying spoofed correlation peaks based on changes between said subframes of said navigation messages in said at least one of clock correction data and ephemeris data.

11. A device according to claim 1, wherein said device is embedded in a global navigation satellite system integrated circuit.

12. A device according to claim 1, wherein said detecting is performed during acquisition of a navigation signal.

13. A device according to claim 1, wherein said detecting comprises seeking a plurality of correlation peaks for at least one of said data sequences over an entire duration of a navigation message subframe.

14. A device according to claim 1, wherein said detecting is performed by digital signal processing of said sampled navigation signal data.

15. A method for mitigating satellite navigation spoofing, comprising:
- detecting, in sampled navigation signal data, correlation peaks for a plurality of data sequences, said data sequences being associated with respective navigation satellites, at least two of said data sequences being associated with different navigation satellites;
- recording respective times of arrival of subframes of navigation messages associated with each of said correlation peaks;
- classifying correlation peaks having times of arrival within a specified time window within a single subframe as legitimate and correlation peaks having respective times of arrival outside of said specified time window as spoofed; and
- decoding navigation messages extracted from said legitimate correlation peaks to a correct geographic location.

16. A method according to claim 15, wherein a navigation message associated with a correlation peak comprises a navigation message extracted from a received signal that is synchronized with said correlation peak, and a time of arrival of a subframe of said navigation message associated with a correlation peak comprises a time at which a specified data symbol of said subframe is received.

17. A method according to claim 15, further comprising decoding navigation messages associated with said spoofed correlation peaks to a spoofed geographic location.

18. A method according to claim 15, wherein a maximum duration of said time window is 20 milliseconds.

19. A method according to claim 15, wherein a maximum duration of said time window is 23 milliseconds.

20. A method according to claim 15, wherein a duration of said time window is 17 milliseconds to 23 milliseconds.

21. A method according to claim 15, wherein said time window begins when a first one of said times of arrival is observed for a current subframe.

22. A method according to claim 15, wherein said classifying further comprises:
- comparing at least one of clock correction data and ephemeris data in subframes of at least one of said navigation messages; and
- identifying spoofed correlation peaks based on changes between said subframes of said navigation messages in said at least one of clock correction data and ephemeris data between said subframes of said navigation messages.

23. A method according to claim 15, wherein said detecting is performed during acquisition of a navigation signal.

24. A method according to claim 15, wherein said detecting comprises seeking a plurality of correlation peaks for at least one of said data sequences over an entire duration of a navigation message subframe.

25. A method according to claim 15, further comprising:
- receiving a radio frequency signal; and
- converting said radio frequency signal into said sampled navigation signal data.

* * * * *